(12) United States Patent
Ego et al.

(10) Patent No.: US 7,384,264 B2
(45) Date of Patent: Jun. 10, 2008

(54) GRID SUPPORT SYSTEM

(75) Inventors: Charles M. Ego, Germantown, WI (US); Marty Benegalia, Granbury, TX (US)

(73) Assignee: Schunk Graphite Technology, Menomonee Falls, WI (US)

( * ) Notice: Subject to any disclaimer, the term of this patent is extended or adjusted under 35 U.S.C. 154(b) by 198 days.

(21) Appl. No.: 11/204,796

(22) Filed: Aug. 16, 2005

(65) Prior Publication Data

US 2005/0274375 A1    Dec. 15, 2005

(51) Int. Cl.
F27D 5/00    (2006.01)

(52) U.S. Cl. ............... 432/261; 432/258; 108/190; 211/188

(58) Field of Classification Search ........... 432/261, 432/258, 162, 6; 264/29.1; 108/91, 156, 108/180, 186, 190, 196; 211/188, 186, 134, 211/194; 248/188; 156/89.26, 92, 93, 245, 156/167, 172, 173, 175, 425, 433, 441
See application file for complete search history.

(56) References Cited

U.S. PATENT DOCUMENTS

| | | | | | |
|---|---|---|---|---|---|
| 1,903,119 A | * | 3/1933 | Ladd | ........................... | 432/258 |
| 1,981,646 A | | 11/1934 | Hamley | ........................... | 35/2 |
| 2,461,606 A | * | 2/1949 | Jackson | ........................ | 432/261 |
| 3,739,921 A | | 6/1973 | Schmidt | ....................... | 211/177 |
| 3,806,124 A | | 4/1974 | Ippen et al. | ................. | 273/130 |
| 3,992,139 A | * | 11/1976 | Lovatt | ........................ | 432/258 |
| 3,997,289 A | * | 12/1976 | Bowers | ........................ | 432/241 |
| 4,227,874 A | | 10/1980 | Nugent | ........................ | 432/261 |
| 4,487,579 A | * | 12/1984 | Irwin | ........................... | 432/241 |
| 4,669,978 A | | 6/1987 | Klefisch | ...................... | 432/261 |
| 4,836,777 A | * | 6/1989 | Elliott | ........................... | 432/241 |
| 4,978,109 A | * | 12/1990 | Vigouroux | .................... | 266/274 |
| 5,016,765 A | * | 5/1991 | Leonardo | ...................... | 211/189 |
| 5,411,153 A | * | 5/1995 | Unfried | ........................ | 211/188 |
| 5,529,732 A | | 6/1996 | Ideguchi et al. | ............. | 264/57 |
| 5,667,379 A | | 9/1997 | Sporer | ......................... | 432/258 |
| 5,752,821 A | | 5/1998 | Jo | .............................. | 432/261 |
| 5,836,760 A | * | 11/1998 | Turner et al. | ............... | 432/253 |
| 6,022,215 A | | 2/2000 | Janousch | ...................... | 433/49 |
| 6,062,150 A | | 5/2000 | Sikora et al. | ............... | 108/190 |
| 6,454,564 B2 | | 9/2002 | Ricchio | ....................... | 432/261 |
| 6,491,865 B2 | | 12/2002 | Zurfluh | ........................ | 266/274 |
| 6,948,435 B1 | * | 9/2005 | Sheng | ......................... | 108/192 |
| 2002/0162624 A1 | | 11/2002 | Ebert et al. | ................. | 156/254 |

* cited by examiner

*Primary Examiner*—Gregory A Wilson
(74) *Attorney, Agent, or Firm*—Whyte Hirschboeck Dudek SC

(57) ABSTRACT

A furnace furniture system comprises multiple shelves supported by a multiplicity of legs, each shelf having multiple openings therethrough. Each leg comprises: (i) at least one modular body having a bottom recess and a top protrusion, the top protrusion adapted to extend through an opening in the shelf and the first protrusion is also adapted to fit within the bottom recess of another leg body; (ii) at least one cap/foot component having a top protrusion that is similar to the leg body top protrusion; and, (iii) means to secure a cap/foot component to an adjacent cap/foot component or leg body; wherein at least one leg comprises a cap/foot component secured to either a first protrusion or a second protrusion extending through an opening in the first shelf and wherein at least one leg comprises a cap/foot component secured to either a first protrusion or a second protrusion extending through an opening in the second shelf. The furnace furniture may also comprise ceramic components to isolate work pieces from contact with the shelves and/or legs. Additionally, the furniture may include ceramic survey rings.

12 Claims, 4 Drawing Sheets

GRID SUPPORT SYSTEM

BACKGROUND OF THE INVENTION

This invention relates generally to an apparatus for use in high-temperature furnaces, and more specifically to furnace furniture for improving the load efficiency and stability in a furnace.

In high-temperature furnace and refractory construction, and in heat treating industrial uses such as hardening, brazing, annealing, tempering, and sintering, bases of preferably gridlike structure that are resistant to high temperature and that must have high mechanical strength are used. CFC (carbon fiber reinforced carbon) grates have proven themselves for this purpose. In the prior art, they are put together from strips or are made from plate material, for instance by waterjet cutting. Grates of metal high temperature alloys made by casting or welding are also known.

The distance between layers is critical to optimize a furnace load without wasting space and money. The legs supporting each successive layer need to be strong, adjustable in height, but have a small footprint and be low in thermal mass. Additionally, many applications require means to prevent parts from rolling or sliding during loading and unloading of the furnace.

BRIEF SUMMARY OF THE INVENTION

In one embodiment, the invention is a furnace furniture system comprising: a shelf having multiple openings therethrough; a multiplicity of legs, each leg comprising (i) at least one modular body having a top end and a bottom end, the bottom end having a recess, the top end having a first protrusion, the first protrusion adapted to extend through an opening in the shelf such that the leg body is self-centered in relation to the opening and the first protrusion is also adapted to fit within the recess in the bottom of another leg body such that the two leg bodies are self-centered in relation to each other; and, (ii) at least one cap/foot component, each cap/foot component comprising a second protrusion, the second protrusion adapted to extend through an opening in the shelf such that the leg body is self-centered in relation to the opening and the second protrusion is also adapted to fit within the recess in the bottom of a leg body such that the cap/foot and the leg body are self-centered in relation to each other; and, means to secure to each other either (i) adjacent cap/foot components or (ii) a cap/foot component adjacent to the first protrusion of a leg body; wherein at least one leg comprises a cap/foot component secured to either a first protrusion or a second protrusion extending through an opening in the first shelf.

In one embodiment, the invention is a furnace furniture system comprising: at least a first shelf and a second shelf, each shelf having multiple openings therethrough; a multiplicity of legs, each leg comprising (i) at least one modular body having a top end and a bottom end, the bottom end having a recess, the top end having a first protrusion, the first protrusion adapted to extend through an opening in the shelf such that the leg body is self-centered in relation to the opening and the first protrusion is also adapted to fit within the recess in the bottom of another leg body such that the two leg bodies are self-centered in relation to each other; and, (ii) at least one cap/foot component, each cap/foot component comprising a second protrusion, the second protrusion adapted to extend through an opening in the shelf such that the leg body is self-centered in relation to the opening and the second protrusion is also adapted to fit within the recess in the bottom of a leg body such that the cap/foot and the leg body are self-centered in relation to each other; and, means to secure to each other either (i) adjacent cap/foot components or (ii) a cap/foot component adjacent to the first protrusion of a leg body; wherein at least one leg comprises a cap/foot component secured to either a first protrusion or a second protrusion extending through an opening in the first shelf and wherein at least one leg comprises a cap/foot component secured to either a first protrusion or a second protrusion extending through an opening in the second shelf.

In another embodiment, a work piece support system comprising ceramic components adapted to isolate work pieces from direct contact with either shelves or legs of a furnace grid support system, wherein the ceramic components are at least one of a tile, U-channel or a ring.

In another embodiment, a survey ring comprising an annular ceramic body having an outer perimeter and an inner perimeter, a first hole and a second hole each extending into the annular body from the outer perimeter, wherein the first hole and the second hole: (i) are parallel to each other; (ii) do not contact the inner perimeter; each contact the outer perimeter at only one point such that the contact point of the first hole is about 180° from the contact point of the second hole.

BRIEF DESCRIPTION OF THE DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts or steps.

Shown are.

DETAILED DESCRIPTION OF THE INVENTION

In the following detailed description, references made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural and material changes may be made without departing from the spirit and scope of the present invention. As a non-limiting example, the following description is written for legs having a circular cross-section and a grid shelf having square openings, but other geometries are possible and are contemplated as part of the invention.

Figure 1:
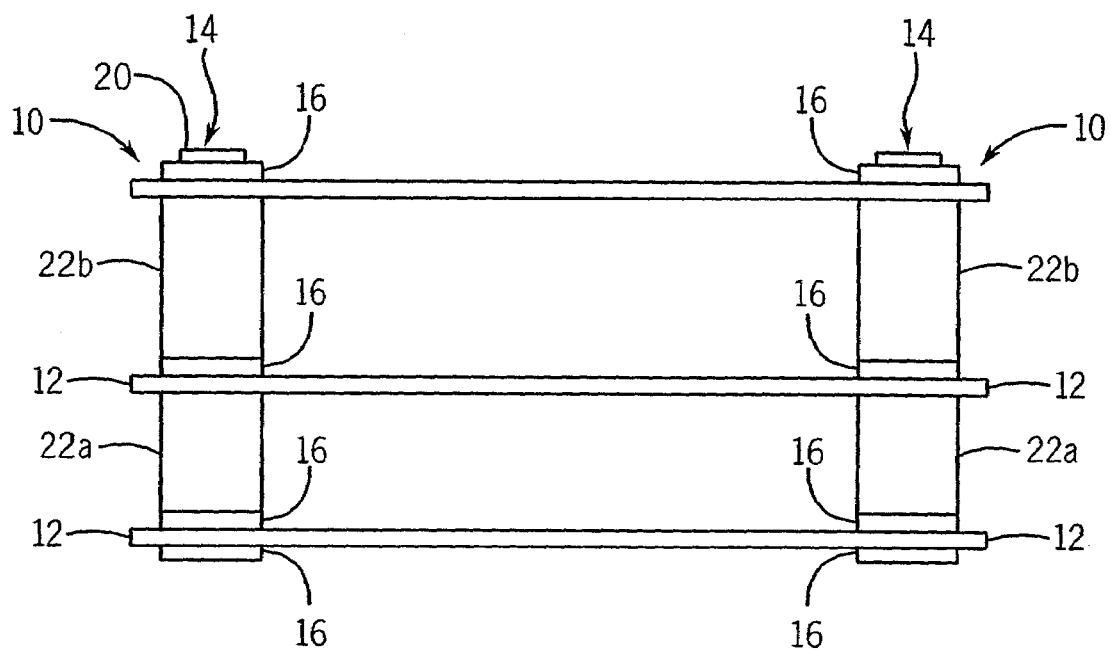
FIG. 1, a side view of the inventive furnace furniture.

FIG. 1 shows a side view of furnace furniture comprising the inventive support system. Grid assembly 10 comprises grid shelves 12 supported by a number of support columns 14. Support columns 14 are modular in design and comprise cap/foot components 16 and interchangeable leg sections 22. Leg sections 22 are typically circular in cross-section. Leg sections 22 can be available in different lengths, as shown for parts 22a and 22b, allowing the user to customize the grid shelf spacing for the particular parts to be heated in the furnace. Cap/foot components 16 have a seating base 18 upon which grid shelves 12 or leg sections 22 rest. Seating base 18 is about the same diameter, preferably is the same diameter, as leg portion 22. The diameters of both leg section 22 and seating base 18 must be large enough to not pass through the openings in the grid of grid shelf 12.

Figure 2:
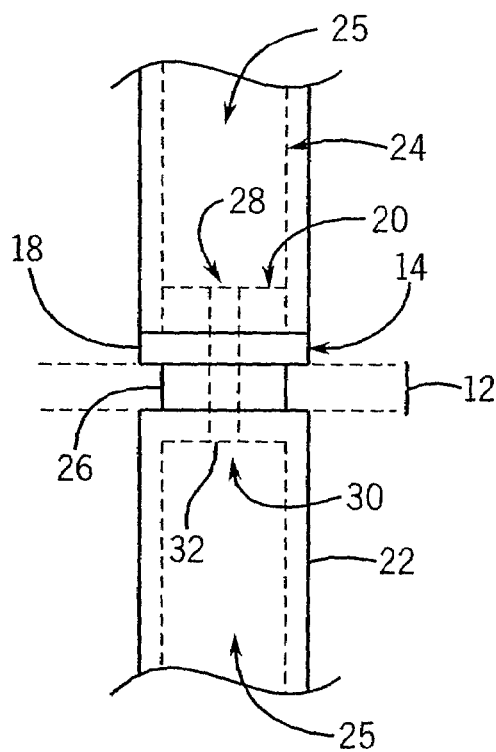
FIG. 2, a cross-sectional view of a portion of a support column.

FIG. 2 is a partial cross-sectional view of the portion of a support column 14. In FIG. 2, grid shelf 12 is phantomed out for improved clarity. A leg section 22 has an inner wall 24 defining a hollow interior space that is open at one end of the leg section. A projection 26 extends axially from the opposite end of the leg. A similar projection 20 extends from the base 18 of cap/foot component 16. Both leg projection 26 and cap/foot projection 20 are designed to extend through a grid opening in grid sheet 12 such that leg 22 or cap/foot 16 is self-centered in relation to the grid opening.

In addition, both leg projection 26 and cap/foot projection 20 have means to lock with a cap/foot component 16 located on the opposite side of grid 12 from the component from which the respective projection extends. In one embodiment, the locking means comprise a hole 28 extending through cap/foot component 16 and a corresponding hole 30 extending through leg projection 26. Hole 30 may extend through the top of the leg to reach hollow space 25. A peg 32 is then inserted through both corresponding holes to lock the two components together as desired. Preferably, peg 32 is threaded to match corresponding threads in holes 28 and 30 (threads not shown). The correspondence of holes 28 and 30 are such that, when pegged together, any two cap/foot components 16 or a leg component 22 and a cap/foot component 16 will be self-centered in relation to each other (and also in relation to the grid opening through which a projection extends.

Both leg projection 26 and cap/foot projection 20 are adapted to extend into hollow space 25 to provide secure seating for the leg component 22 into which the projection extends. Again, the correspondence of the projection 26 or 20 and the hollow space 25 provide a self-centering relationship between the two intermeshing components.

The modular locking or intermeshing nature of the support system allows a user to easily assemble furnace furniture having an optimal number of support legs to support the load of material to be fired in the furnace. The support legs can be located in any opening of the grid mesh allowing the support system to form a stable footprint in order to accommodate uneven weight loading, or parts of differing sizes, without unnecessarily increasing the weight of the support system. Likewise, the spacing between grid shelves can be tailored to accommodate different size pieces.

The modular support system is preferably comprised of graphite, while carbon/carbon composites are more expensive alternatives. Production of furnace components from such materials is well-known in the art. For example, graphite furniture can be formed by milling petroleum coke, coal tar coke, and/or natural graphite with a binder comprising resin, typically a phenol derived resin, or pitch to form a blend. The blended graphite material is then extruded to form a green body blank. The blank is then carbonized at a temperature $T_1$ where $500°\ C.\leq T_1 \leq 1450°\ C.$; and in particular $900°\ C.\leq T_1 \leq 1200°\ C.$, or graphitized at a temperature $T_2$ where $1500°\ C.\leq T_2 \leq 3000°\ C.$, and in particular $1800°\ C.\leq T_2 \leq 2500°\ C.$ The graphitized blank is then machined into the desired shape.

Composite materials can be made by known methods, also. For example, the materials for a component are placed in a mold that predetermines or substantially predetermines its final geometry, and before or after being placed in the mold is provided with a monomer such as resin or a polymer and then cured. In particular, it is provided that the preform, for curing, is subjected to a heat treatment. A blank thus produced can then be pyrolized. The curing of the fiber preform takes place in the mold, and the pyrolizing and carbonizing and/or graphitizing are done in-place or outside of the mold. In particular, a fiber preform is used that as its fibers has roving strands and/or fibers or slivers comprising natural, glass, aramide, polymer, carbon and/or ceramic fibers. As the resin itself, a phenol-derived resin, such as resol in particular, is especially used.

Although preferably the preform is impregnated or saturated with resin, and a phenol-derived resin is to be emphasized, the possibility also exists that along with the reinforcing fibers, polymer fibers that form the matrices, such as PEEK fibers, PPS fibers, PA fibers, PE fibers or PP fibers are used.

It should also be pointed out that the teaching of the invention is also intended for producing components that comprise fiber reinforced plastic material. The preform used can be subjected to cold or hot curing. Corresponding components comprising fiber-reinforced plastic can furthermore be at least carbonized but also carbonized and graphitized, making components of fiber reinforced carbon or graphite available. As preferred reinforcing fibers, ceramic fibers such as SiC fibers or carbon fibers can be named. In other words, with the teaching of the invention both fiber-reinforced plastic components and fiber reinforced carbon components can be made, which are distinguished in particular by their high-temperature resistance.

The fiber preforms are produced in particular by tailored fiber placement (TFP) technology. In this, fiber material unwound from a spool is laid and joined with sewing thread in such a way that a preform of desired geometry is available; different material thicknesses can be attained by stitching repeated layers on top of one another.

Preforms made by TFP technology and having intersection points such as nodes have the advantage that the fiber volume is the same or substantially the same over the entire preform, as long as endless fibers are used as the reinforcing fibers. In other words, the volume at the intersection point or node is approximately the same as that of the crosspieces that connect the intersection points or nodes. This is an emphatic advantage over the components of endless fibers produced by the prior art, in which at the intersection or node points there is a markedly increased fiber volume, normally twice as high.

It is also possible to produce the preforms by tow placement methods with appropriate final pressing, or by the resin transfer molding (RTM) technique.

A thus-produced preform is then impregnated with resin and placed in a die of a pressing tool, which die in turn has mold voids that correspond to the geometry of the preform and thus of the final form. The voids themselves are defined by flexible elements, so that regardless of the shrinkage that occurs in curing, a release of the cured preform (blank) is possible by exerting pressure on the flexible elements. During the curing, a further die, which corresponds to the negative shape of the voids that receive the preform, acts on the preform. This is preferably a die comprising metal, such as steel. After curing the pre-form or blank is carbonized or graphitized as described above.

Figure 5:
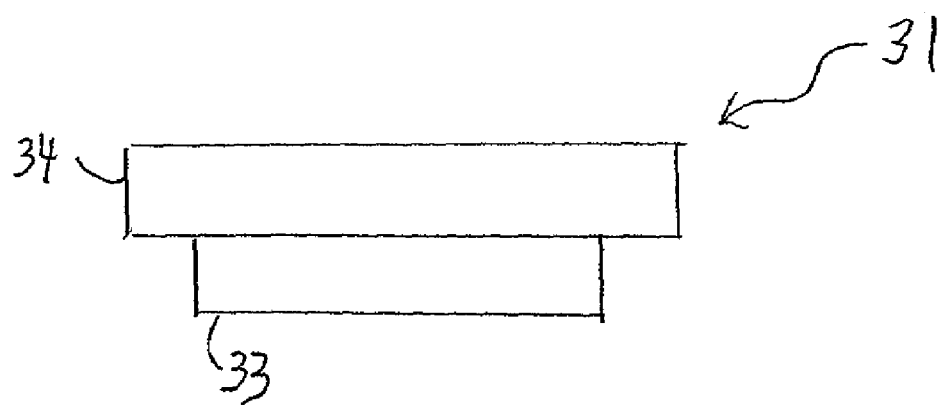
FIG. 5, side view of a ceramic tile.
Figure 6:
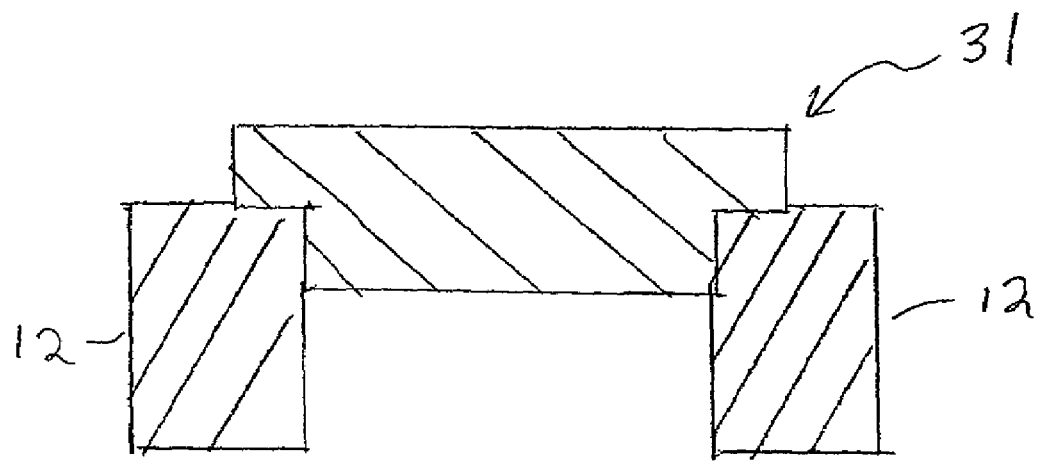
FIG. 6 is a cross-sectional side view of a ceramic tile positioned in a grid support.

In many applications, the pieces being fired must be isolated from contact with each other and from contact with the graphite of the grid shelves and support legs in order to avoid forming a eutectic mixture. In one embodiment of this invention, such isolation is achieved through use of ceramic tiles and rings. As shown in FIGS. 5 and 6, the ceramic tiles 31 are designed to fit within one square of the grid shelf 12. Tile 31 has a stepped profile comprising a lower portion 33 and an upper portion 34 that overhangs lower portion 32. Lower portion 32 is adapted to fit within an opening in grid shelf 12, preferably providing a self-centering alignment by having dimensions only slightly smaller than the corresponding dimensions of the opening. Upper portion 34 has dimensions greater than the corresponding dimensions of the opening, thereby providing a shoulder to prevent the tile from falling through the opening. This design allows tile 31 to be dropped into place in the opening in a manner similar to ceiling tiles in a suspended ceiling. The modular nature of the ceramic tiles 31 allows the user to minimize extra thermal mass by placing only the tiles needed on the grid.

Figure 3:
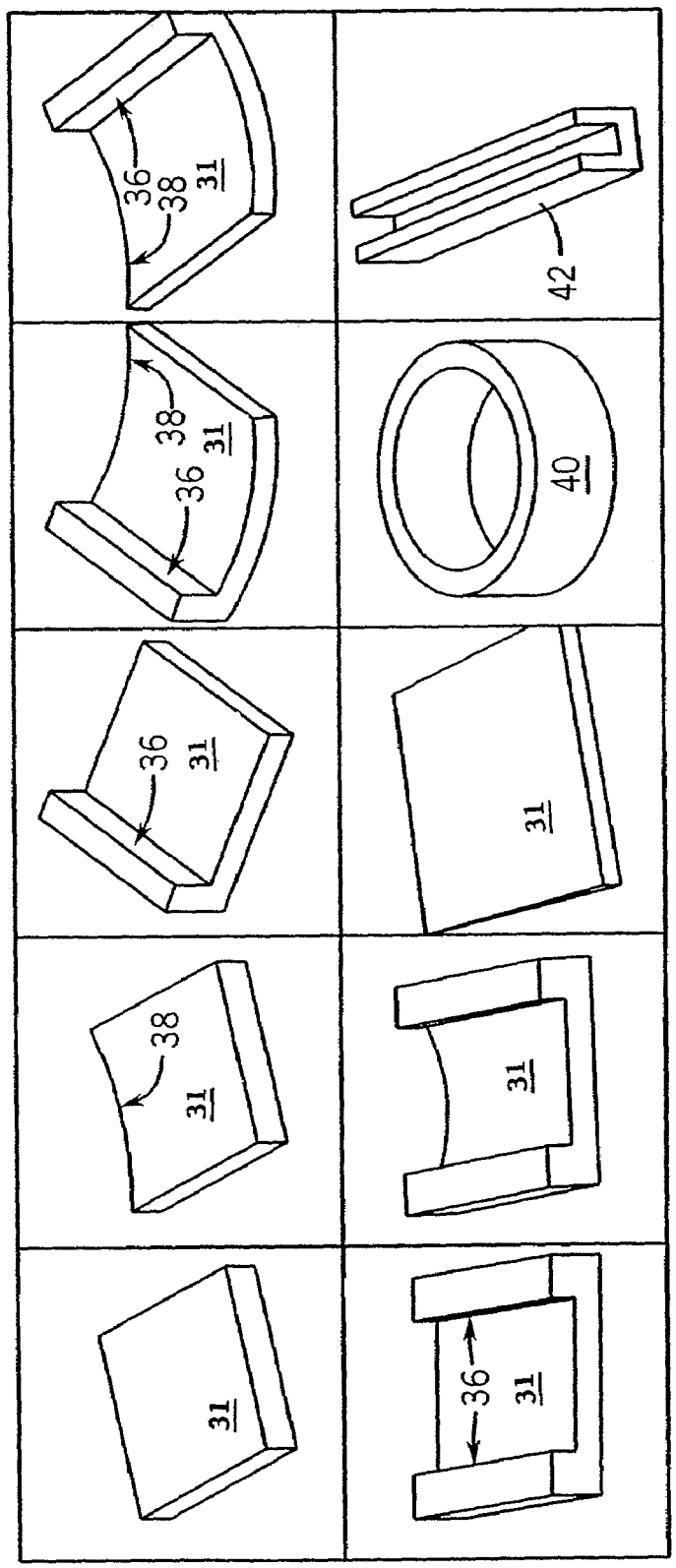
FIG. 3, ceramic tiles.
Figure 4B:
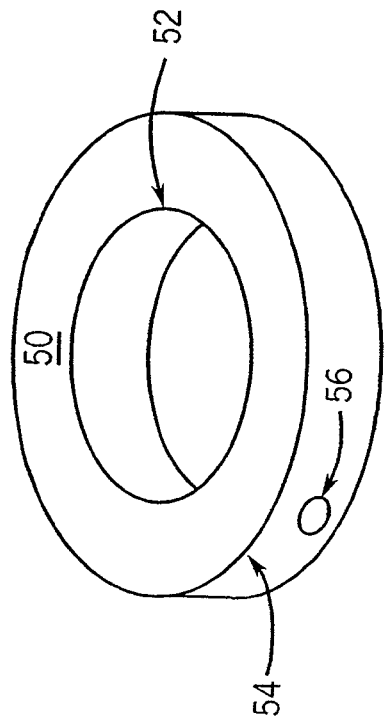
FIG. 4, survey ring.
Figure 4A:
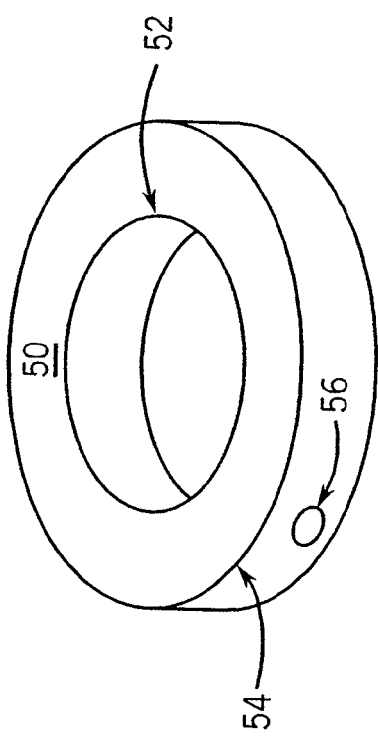
Figure 4D:
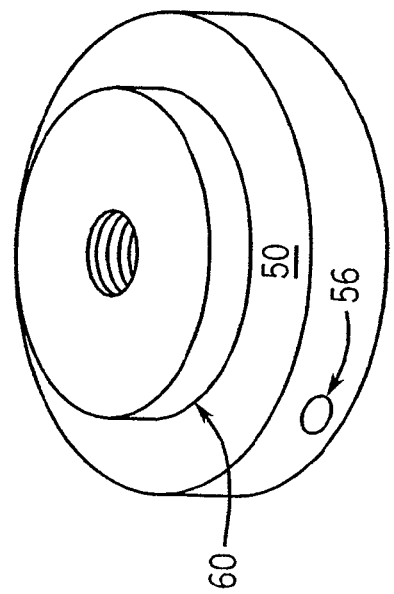
Figure 4C:
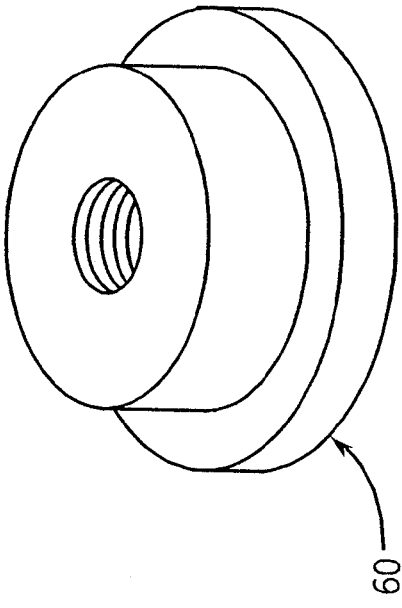

As shown in FIG. 3, tile 31 can be modified to provide enhanced performance in specific circumstances. In particular, at least one curb 36 can be formed on the side of the tile facing away from the grid shelf. Tiles having a curb 36 can be used as edge tiles to prevent parts from slipping off of the shelves, particularly during loading and unloading the furnace. Tiles with multiple curbs 36 can be used to prevent round parts from rolling off of the support tile 31.

Other tile modifications can include a rounded cutout 38 on an edge of the tile 31. Cutout 38 allows the tile to fit against a cap/foot or an inverted support leg, particularly when an isolation ring 40 surrounds the leg. Isolation ring 40 is an annular ring having an inner diameter 42 and an outer diameter 44. Inner diameter 42 is preferably sized to allow the isolation ring 40 to slide over the leg 22 without wasting clearance. Outer diameter 44 is sized to provide the minimum ring width necessary to provide adequate strength to ring 40 without adding more mass than needed. The rounded cutout 38 of tile 30 has the same curvature as a support leg or cap/foot component.

A further modified tile is a U-channel tile 42 which is designed to isolate wires, such as thermocouple leads, from the work pieces.

Tiles 31, isolation rings 40, and U-channels 42 are preferably formed from ceramic material. Different grades of ceramic material, for example, 99.5% alumina, 92% alumina, cordierite and others known in the art, can be used. Also, the size and density of the pore structure of the ceramic material can be varied as known in the art to optimize the tiles and rings.

Another desirable accessory of the inventive furnace furniture system is annular survey ring 50 as shown in FIG. 4. Survey ring 50 has an inner diameter 52 and an outer diameter 54. Typically, inner diameter 52 is selected to allow the survey ring 50 to seat around a projection of survey nut 60. The combined assembly of survey ring 50 and survey nut 60 has the same dimensions and profile as the cap/foot unit. Outer diameter 54 is sized as needed to provide sufficient strength for the structure of ring 50 without adding unnecessary thermal mass to the furnace load. At least one hole 56 is formed into the body of the survey ring 50. In a preferred option, two holes 56 are formed into survey ring 50 parallel to each other and are located 180 apart along the circle defined by outer diameter 54. Holes 56 enter the annular body of survey ring 50 at an angle such that the holes will not intersect the inner diameter 52 and are not deep enough to intersect with the outer diameter 58 at a second point. Holes 56 are typically centered on the vertical height of the annular body of survey ring 50. Holes 56 can have round, V, or square bottoms. Each hole will have a diameter and depth necessary to provide a secure snug fit for a standard sized thermocouple probe.

The survey ring should have a good crush resistance across the thickness. Therefore, survey ring 50 is preferably constructed from strong ceramic materials like 99.5% alumina or cordierite. Survey ring 50 can have a porous or a solid structure as shown in FIG. 4, views A and B respectively.

An example of the dimensions for a porous survey ring suitable for a grid having 2-inch by 2-inch openings is as follows: outer diameter equals 2.75 in; inner diameter equals 1.50 in; thickness equals 0.5 in; diameter of first hole equals 0.130 in; and, diameter of second hole equals 0.170 in. An example of a solid survey ring can have first and second hole diameters of 0.065" and 0.125", respectively. Again, the hole diameters are selectable to conform to the size of the thermocouple probe.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A furnace furniture system comprising:
at least a first shelf and a second shelf, each shelf having multiple openings therethrough;
a multiplicity of legs, each leg comprising (i) at least one modular body having a top end and a bottom end, the bottom end having a recess, the top end having a first protrusion, the first protrusion adapted to extend through an opening in the shelf such that the leg body is self-centered in relation to the opening and the first protrusion is also adapted to fit within the recess in the bottom of another leg body such that the two leg bodies are self-centered in relation to each other; and, (ii) at least one cap/foot component, each cap/foot component comprising a second protrusion, the second protrusion adapted to extend through an opening in the shelf such that the leg body is self-centered in relation to the opening and the second protrusion is also adapted to fit within the recess in the bottom of a leg body such that the cap/foot and the leg body are self-centered in relation to each other; and,
means to secure to each other either (i) adjacent cap/foot components or (ii) a cap/foot component adjacent to the first protrusion of a leg body;
wherein at least one leg comprises a cap/foot component secured to either a first protrusion or a second protrusion extending through an opening in the first shelf and wherein at least one leg comprises a cap/foot component secured to either a first protrusion or a second protrusion extending through an opening in the second shelf.

2. The furnace furniture system of claim 1 further comprising more than two shelves wherein each shelf is secured by at least one leg comprising a cap/foot component secured to either a first protrusion or a second protrusion extending through an opening in the shelf.

3. The furnace furniture system of claim 1 wherein consecutive shelves arrayed along the leg have a separation distance that can be varied by using leg bodies having different lengths.

4. The furnace furniture system of claim 1 wherein the means to secure comprise a peg inserted into corresponding holes in the (i) adjacent cap/foot components or (ii) a cap/foot component adjacent to the first protrusion of a leg body.

5. The furnace furniture system of claim 1 further comprising ceramic components to isolate work pieces from direct contact with either the shelves and/or the legs.

6. The furnace furniture system of claim 5, wherein the ceramic components are at least one of a tile or a ring.

7. The furnace furniture system of claim 6, wherein the ceramic component is a tile having a profile having a lower step and an upper step such that the lower step is adapted to fit within an opening in the shelf and the upper step is adapted to overhang the lower step and seat upon the shelf.

8. The furnace furniture system of claim 7, wherein the upper step comprises a curb adapted to prevent a work piece from falling off the tile.

9. The furnace furniture system of claim 6 wherein the ceramic component is a ring adapted to fit around the leg body.

10. The furnace furniture system of claim 9 further comprising a tile that is adapted to mate with the ring.

11. The furnace furniture system of claim 1 further comprising a ceramic survey ring comprising an annular body having an outer perimeter and an inner perimeter, a first hole and a second hole each extending into the annular body from the outer perimeter, wherein the first hole and the second hole: (i) are parallel to each other; (ii) do not contact the inner perimeter; each contact the outer perimeter at only one point such that the contact point of the first hole is about 180° from the contact point of the second hole.

12. The furnace furniture system of claim 11, wherein the first hole has a different diameter than the second hole.

* * * * *